Figure 1:
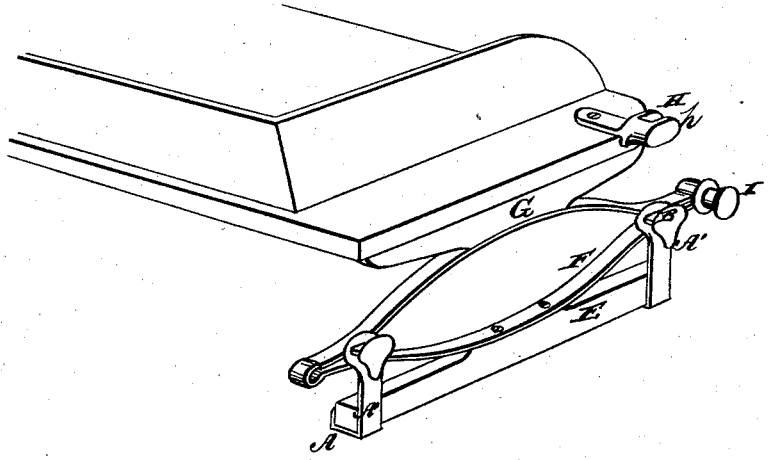
Figure 2:
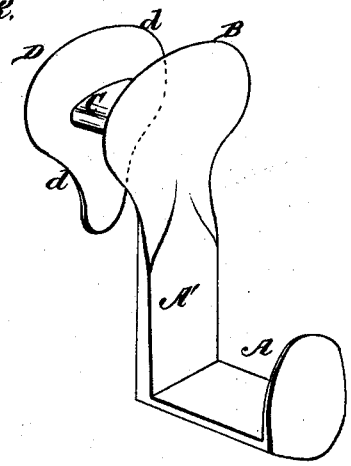

W. P. BROWN.
Support for Wagon-Seats.

No. 216,147.  Patented June 3, 1879.

WITNESSES  
Robert Everett  
R. Clay Smith

INVENTOR  
William P. Brown  
By Gilmore, Smith & Co.  
ATTORNEYS.

UNITED STATES PATENT OFFICE.

WILLIAM P. BROWN, OF ZANESVILLE, OHIO.

IMPROVEMENT IN SUPPORTS FOR WAGON-SEATS.

Specification forming part of Letters Patent No. 216,147, dated June 3, 1879; application filed April 7, 1879.

*To all whom it may concern:*

Be it known that I, WILLIAM P. BROWN, of Zanesville, in the county of Muskingum and State of Ohio, have invented certain new and useful Improvements in Seat-Hook Supports for Wagons; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to a device for holding a seat upon a wagon-box, allowing the seat to be turned without loosing any mechanism, and supporting the springs against lateral strain or displacement; and the novelty consists in the construction and arrangement of parts of the said seat-hook, as will be more fully hereinafter set forth.

The hook proper consists, essentially, in the bearing socket or hook for the spring-bar, a standard with a flanged upper surface, a bearing-shank to rest upon the upper edge of the wagon-box, and an outer flange. The bearing-shank is so arranged relatively to the flanges near the center as to present a circumferential socket to receive the edge of the side-board, is adapted to slide readily to and fro on said edge, and to be turned at will without displacement, the flanges upon the circumferential socket at all times embracing the edge of the side-board.

It will be observed that, as shown, the device is attached to a spring-seat, and that the shank between the hook and bearing provides a support for the springs; but the device may be applied to other seats without springs, without departing from the principle of my invention, the essential features of which are the flanges and bearing forming the continuous socket on a seat-hook.

Referring to the drawings, A represents the hook or socket which receives the spring-bar of a spring wagon-seat; A', the shank, which, extending upward, terminates in a flaring flange, B. C represents a flat arm or bearing-lug, the under side of which is preferably flat, and it connects the flange B with an outer plate, D, having flanged edges d, as shown, so that when the seat is turned back the upwardly-projecting flanges will embrace the edge of the side-board and prevent displacement of the seat.

The parts described are made or cast in one piece of metal, the hook A being adapted to support the seat, and the arm C to rest upon the upper edge of the side-boards of a wagon-box, said edge being embraced by the flanges B d, which allows the seat to be turned over, as is often necessary in unloading, &c., without trouble or displacement.

As applied to a spring-seat, the hook A receives the spring-bar E, and the shank supports the spring F from lateral sway or wrenching, due to unlevel ground. Upon this spring rests the seat-bearing G, upon which a pivoted rest, H, may be secured, as shown. The spring-pivot I may have an extension affording a circumferential recess, if desired, which will embrace the edge of the side-board and prevent lateral motion of the spring at that point, and will form a bearing-point when the seat is being turned back.

The pivoted piece H has jaws h, which, when in use, receive the edge of the side-board, and may by thrown in or out of action at will, being used only when seat is turned back to engage with the edge of the side-board, and thus support the seat thereon.

I claim—

1. The seat-hanger described, having flanges B d, forming a circumferential socket around the bearing-arm C and the hook A, as and for the purpose set forth.

2. The hook A, shank A', flange B, arm C, and plate D, having flanges d d, forming a circumferential socket around the bearing-arm C, made of one piece of metal, adapted to serve as and for the purpose set forth.

In testimony that I claim the foregoing as my own I affix my signature in presence of two witnesses.

WILLIAM P. BROWN.

Witnesses:
 ROBERT M. BARR,
 H. CLAY SMITH.